(12) United States Patent
Kolehmainen et al.

(10) Patent No.: US 10,541,574 B2
(45) Date of Patent: Jan. 21, 2020

(54) ROTOR FOR ELECTRIC MACHINE, AND MANUFACTURING METHOD OF ROTOR

(71) Applicant: ABB Schweiz AG, Baden (CH)

(72) Inventors: Jere Kolehmainen, Vaasa (FI); Tero Känsäkangas, Vaasa (FI)

(73) Assignee: ABB Schweiz AG, Baden (CH)

( * ) Notice: Subject to any disclaimer, the term of this patent is extended or adjusted under 35 U.S.C. 154(b) by 41 days.

(21) Appl. No.: 15/750,389

(22) PCT Filed: Jul. 1, 2016

(86) PCT No.: PCT/EP2016/065574
§ 371 (c)(1),
(2) Date: Feb. 5, 2018

(87) PCT Pub. No.: WO2017/021078
PCT Pub. Date: Feb. 9, 2017

(65) Prior Publication Data
US 2018/0233971 A1 Aug. 16, 2018

(30) Foreign Application Priority Data

Aug. 5, 2015 (EP) .................................... 15179850
Oct. 22, 2015 (EP) .................................... 15191034

(51) Int. Cl.
*H02K 1/02* (2006.01)
*H02K 19/14* (2006.01)
(Continued)

(52) U.S. Cl.
CPC .............. *H02K 1/246* (2013.01); *H02K 1/02* (2013.01); *H02K 1/2766* (2013.01); *H02K 19/14* (2013.01); *B22D 19/0054* (2013.01)

(58) Field of Classification Search
CPC ...... H02K 1/246; H02K 1/276; H02K 1/2766; H02K 1/02; H02K 2213/03; H02K 19/14;
(Continued)

(56) References Cited

U.S. PATENT DOCUMENTS 5,903,080 A * 5/1999 Nashiki .................. H02K 1/246
310/162
6,058,596 A  5/2000 Jansen et al.
(Continued)

FOREIGN PATENT DOCUMENTS

DE  102014201740 A1  8/2014
DE  102014014487 A1  8/2015
(Continued)

OTHER PUBLICATIONS

European Patent Office, International Search Report & Written Opiniom issued in corresponding Application No. PCT/EP2016/065574, dated Oct. 25, 2016, 9 pp.
(Continued)

*Primary Examiner* — Mang Tin Bik Lian
*Assistant Examiner* — Alexander A Singh
(74) *Attorney, Agent, or Firm* — Taft Stettinius & Hollister LLP; J. Bruce Schelkopf

(57) ABSTRACT

A rotor for an electric machine, wherein the rotor comprises a plurality of stack elements and each of the stack elements includes material of first magnetic conductance. Each of the stack elements includes a plurality of sectorial sections distributed round a rotational axis of the rotor. Each of the sectorial sections includes one or more flux barriers. At least one of the one or more flux barriers has a difference associated with filing of an electrically conductive material of third magnetic conductance in different sectorial halves of a common sectorial section, the first magnetic conductance being larger than the third magnetic conductance.

10 Claims, 6 Drawing Sheets

(51) Int. Cl.
*H02K 1/24* (2006.01)
*H02K 1/27* (2006.01)
*B22D 19/00* (2006.01)

(58) Field of Classification Search
CPC .... H02K 19/103; H02K 17/205; H02K 17/20; H02K 17/16; H02K 17/165; H02K 17/18; H02K 17/185; H02K 15/0012; B22D 19/0054
USPC .............. 310/156.83, 156.84, 211, 212, 125, 310/156.78, 156.81
See application file for complete search history.

(56) References Cited

U.S. PATENT DOCUMENTS

| | | | |
|---|---|---|---|
| 2003/0111927 A1 | 6/2003 | Takita et al. | |
| 2003/0173861 A1 | 9/2003 | Kawaguchi et al. | |
| 2016/0056674 A1* | 2/2016 | Buettner | H02K 15/02 310/46 |
| 2017/0222505 A1* | 8/2017 | Janjic | H02K 1/246 |

FOREIGN PATENT DOCUMENTS

| | | | | |
|---|---|---|---|---|
| EP | 2752971 A1 | 7/2014 | | |
| EP | 2790295 A1 | 10/2014 | | |
| EP | 2790296 A1 | 10/2014 | | |
| JP | 2003-189568 A | 7/2003 | | |
| WO | WO-2014166555 A2 * | 10/2014 | | H02K 15/02 |

OTHER PUBLICATIONS

European Patent Office, Extended Search Report issued in corresponding Application No. 15191034.6, dated Apr. 11, 2016, 7 pp.

European Patent Office, Extended Search Report issued in corresponding Application No. 15179850.1, dated Jan. 20, 2016, 7 pp.

The Korean Intellectual Property Office, Notification of the Reasons for Rejection, issued in corresponding Korean application No. 10-2018-7005770, dated Jan. 16, 2019, 9 pp.

* cited by examiner

ROTOR FOR ELECTRIC MACHINE, AND MANUFACTURING METHOD OF ROTOR

FIELD

The invention relates to a rotor for an electric machine, and a manufacturing method of a rotor.

BACKGROUND

A rotor of a synchronous reluctance motor or engine is formed by arranging a plurality of at least approximately circular, plate-like stack elements of magnetically conductive material, which have a high value of relative permeability, such as electrical steel, in stack by lamination. The stack elements are divided in sectorial sections the number of which corresponds to that of poles of the motor. Each of the sectorial sections has at least one magnetic flux barriers which forms barrier channels in an axial direction of the rotor and which thereby guide the magnetic field in the rotor. The flux barriers may be filled with electrically conductive material such as aluminium which has a lower relative permeability than the magnetically conductive material.

The filling consumes large amounts of the electrically conductive material which, in turn, causes undesired use of natural resources and large economical cost. Additionally, it is known on the basis of simulations, for example, that the present electric motors are not ideal in operation. However, a change in design of the stack elements would require new and lengthy research project directed to flux barriers, new tooling to punch the new kind of flux barriers to the stack elements on the basis of the research project, and heavy investments on both the research and the production.

Hence, there is a need for an improvement.

BRIEF DESCRIPTION

The present invention seeks to provide an improvement associated with the rotor. According to an aspect of the present invention, there is provided a rotor as specified below.

According to another aspect of the present invention, there is provided a method of manufacturing a rotor.

The invention has advantages. Consumption of the electrically conductive material for filling can be reduced. Efficiency of the electric motor can be increased with the partial filling of the flux barriers without a change in a stack element design which is meant for stack elements the flux barriers of which will be fully filled.

LIST OF DRAWINGS

Example embodiments of the present invention are described below, by way of example only, with reference to the accompanying drawings, in which FIG. 1 illustrates an example of a stack element of a rotor for an electric motor;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. It is apparent to a person skilled in the art that the described apparatus may also comprise other functions and structures than those described in Figures and text. Therefore, they need not be discussed in more detail here.

Figure 1:
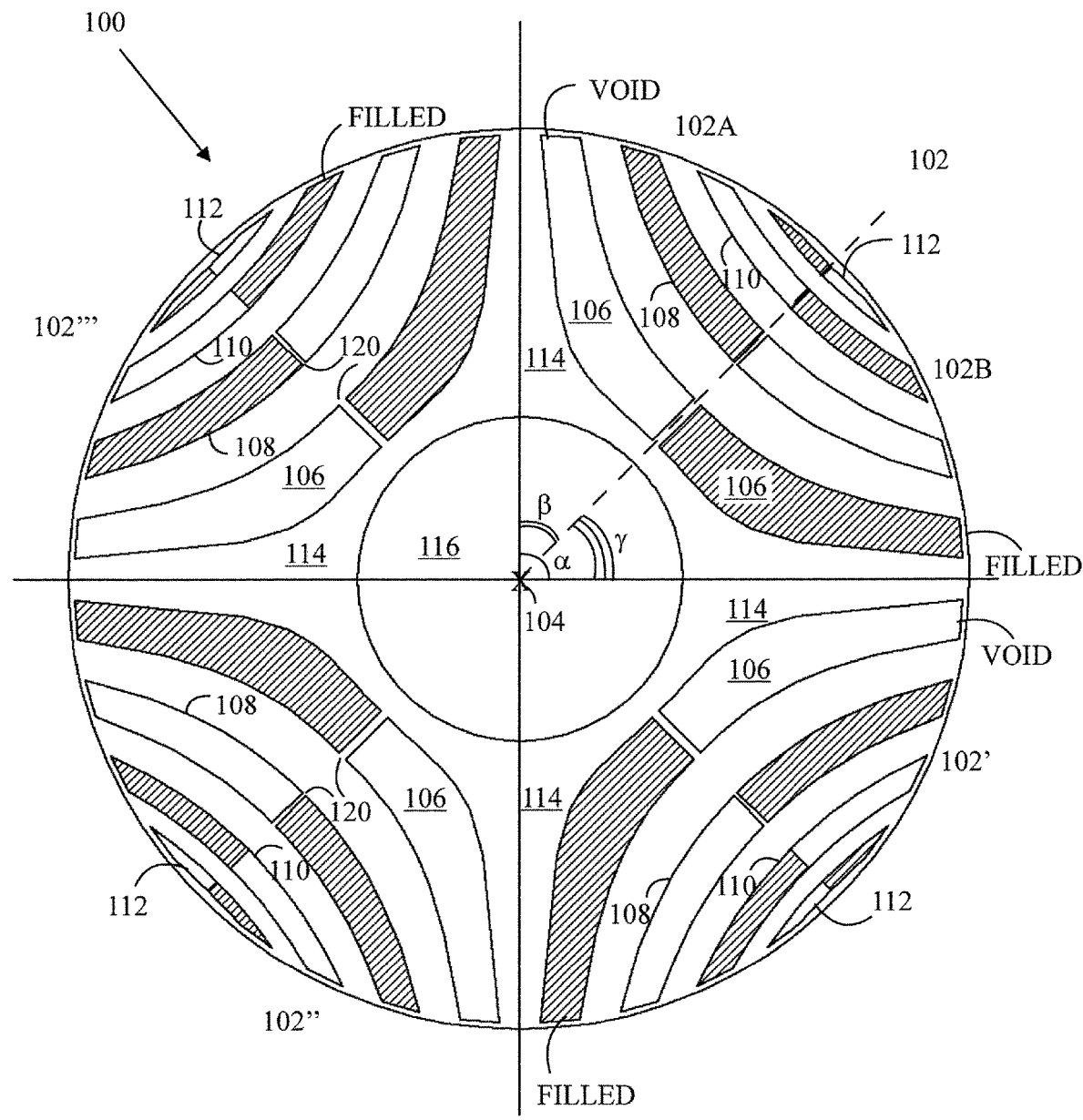

FIG. 1 illustrates an example of a stack element 100 a rotor for an electric machine which may be an electric motor or an electric generator. The stack element 100 may be a round plate which is made of material of a first magnetic conductance. In an embodiment, the plate may have a constant thickness. In an embodiment, thickness of the plate may be different at different positions of the plate. In an embodiment, different plates may have different thickness. Typically the stack element 100 is mainly made of the material of the first magnetic conductance. The material of the stack element 100 may be electrical steel or compressed powder metal, for example.

The stack element 100 comprises a plurality of sectorial sections 102, 102', 102", 102''' distributed round a rotational axis 104 of the stack element 100.

A number of the sectorial sections 102, 102', 102", 102''' may be the same as a number of poles of the electric motor or generator. In an embodiment, the sectorial sections 102, 102', 102", 102''' may refer to poles of the rotor. In general, there may be one or more sectorial sections per a pole. In FIG. 1, only one sectorial section 102, 102', 102", 102''' is divided into two halves 102A, 102B with a dashed line but in general all sectorial sections 102, 102', 102", 102''' can be divided into sectorial halves 102A, 102B in a similar manner. The sectorial halves 102A, 102B are not sectorial sections 102, 102', 102", 102''' because each sectorial half 102A, 102B is only a part of a sectorial section 102, 102', 102", 102'''.

Figure 2:
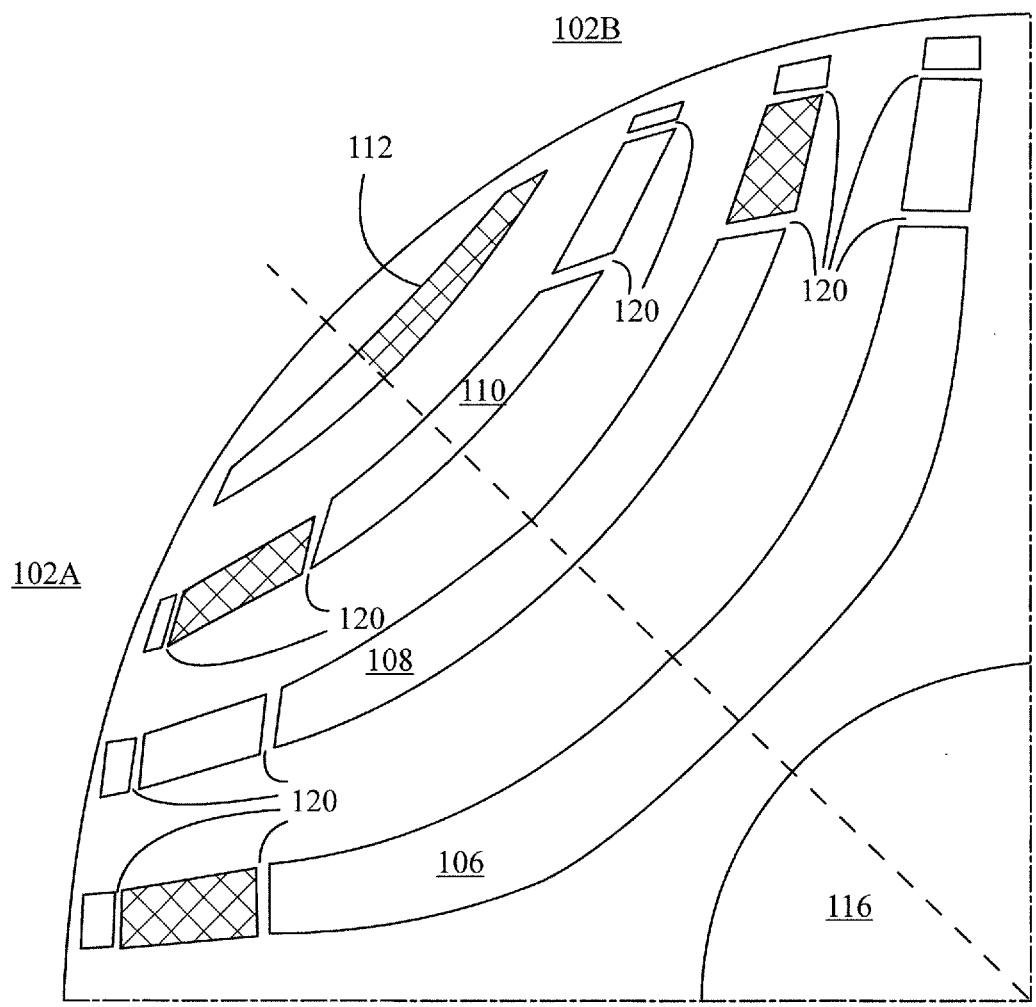
FIG. 2 illustrates an example of a sectorial section of a stack element.

FIG. 2 illustrates on example of one sectorial section 102, 102', 102", 102''' i.e. a pole.

Each of the sectorial sections 102, 102', 102", 102''' comprises one or more flux barriers 106, 108, 110, 112 of a second magnetic conductance. A numeric value of the first magnetic conductance is larger than that of the second magnetic conductance. The magnetic conductance may be expressed using permeability. A higher magnetic conductance of a material or an object means that the material or the object has a higher relative permeability.

At first, the flux barriers 106, 108, 110, 112 are open apertures in the stack element 100. But at least one aperture is partially filled with an electrically conductive material of a third magnetic conductance. A numeric value of the first magnetic conductance is larger than that of the third magnetic conductance. An unfilled part of the at least one of the one or more flux barriers 106, 108, 110, 112 has a fourth magnetic conductance. The numeric value of the first magnetic conductance is larger than that of the fourth magnetic conductance. The filling may be performed by casting, for example. The casting may be performed to a rotor having a plurality of stack elements piled together. The parts of flux barriers which will not be filled, may be masked with a mask plate, for example. That is, the mask plate will block the electrically conductive material to be cast in certain flux channels, which are parallel with the rotational axis of the rotor and which locate within the rotor 100. Such parts of the at least one flux barrier 106, 108, 110, 112 will be void. Additionally or alternatively, other structures, which may extend into the flux channels within the rotor 100, may be used to control the casting such that the filling will be realized in a desired manner. How to cast and how to control the casting, per se, can be considered known to a person skilled in the art.

In Figures, the parts of the at least one flux barrier 106, 108, 110, 112, which are filled with the electrically conducting material, are hatched. The electrically conductive material may be aluminum, copper, their alloys and/or carbon fiber, for example. Thus, the second magnetic conductance may have values between the third magnetic conductance and the fourth magnetic conductance within the at least one flux barrier 106, 108, 110, 112.

The magnetic conductance of the electrically conductive material is thus lower than the first magnetic conductance. Similarly, if the flux barrier has no filling, the fourth magnetic conductance related to air, some other gas or vacuum in this case is lower than the first magnetic conductance.

Any sectorial section 102, 102', 102", 102''' may be divided into two halves. In an embodiment, the two halves may be identical sectors. In an embodiment, the two halves may have an identical size. In an embodiment, the two halves may be mirror images of each other except for the fillings of the flux barrier 106, 108, 110, 112. In an embodiment, the dashed line which divides the sectorial section 102 into two halves 102A, 102B may divide a value of an opening angle $\alpha$ of the sectorial section 102 by two; $\beta=\alpha/2$, where is an opening angle $\beta$ of each half 102A, 102B. When the opening angle $\beta$ is the same as $\alpha/2$, also the opening angle $\gamma$ is the same as the opening angle $\beta$, i.e. $\gamma=\alpha/2$. In general, the opening angle $\beta$ may be approximately the same as $\alpha/2$, and in a similar manner the opening angle $\gamma$ is approximately the same as the opening angle $\beta$ or $\alpha/2$.

At least one of said one or more flux barriers 106, 108, 110, 112 has a difference associated with filling of an electrically conductive material of a third magnetic conductance in different sectorial halves 102A, 102B of a common sectorial section 102, 102', 102", 102''', the first magnetic conductance being larger than the third magnetic conductance. In an embodiment, the difference associated with the filling may be such that one half has a filling material and another half doesn't have the filling material. In an embodiment, the difference associated with the filling may be such that a first half has more filling material than a second half. In an embodiment, the fact that the first half has more filling material than the second half may mean that the first half has a greater amount of the filling material than the second half. In an embodiment, the fact that the first half has more filling material than the second half may mean that the filling in the first half has more mass than the filling material in the second half. In an embodiment, the fact that the first half has more filling material than the second half may mean that the filling in the first half has more volume than the filling material in the second half.

That is, the at least one flux barrier 106, 108, 110, 112 is filled differently in different sectorial halves 102A, 102B which are associated with a common sectorial section 102, 102', 102", 102'''. Thus, the at least one flux barrier 106, 108, 110, 112 is filled differently in different sectorial halves 102A, 102B of a common sectorial section 102, 102', 102", 102'''. The stack elements 100 may also have one or more other flux barriers which are fully filled, or the stack elements 100 may have one or more other flux barriers which are not filled at all.

The filling may be based on a degree of filling. The degree of filling of a part of a flux barrier 106, 108, 110, 112 in one sectorial half 102A and the degree of filling of a part of the flux barrier 106, 108, 110, 112 in another sectorial half 102B of a common sectorial section 102, 102', 102", 102''' deviate from each other. In other words, the degree of filling of a part of a flux barrier 106, 108, 110, 112 in different sectorial halves 102A, 102B of a common sectorial section of the sectorial sections 102, 102', 102", 102''' deviate from each other.

In an embodiment, the degree of filling may refer to a volume of the electrically conductive material related to a volume of the aperture of the flux barrier 106, 108, 110, 112. When the stack element 100 has a constant thickness, the degree of filling may refer to a ratio between an area of the electrically conductive material and an area of the aperture of the flux barrier 106, 108, 110, 112 or the like, for example.

When there are more than one flux barrier 106, 108, 110, 112 in a sectorial section 102, 102', 102", 102''', a degree of filling of one of the flux barriers 106, 108, 110, 112 may deviate from that of another of the flux barriers 106, 108, 110, 112 of a common sectorial half 102A, 102B. The degree of filling may be determined of the basis of percentage of the filling with respect to a volume to be filled or the maximum mass required to filling the volume. The percentage may be measured on the basis of mass or volume of the filling material used. That may be true for any of the plurality of the sectorial sections 102, 102', 102", 102'''.

In an embodiment, the apertures of the flux barriers or the flux barriers 106, 108, 110, 112 themselves may be continuous structures in the stack element 100. That is, the apertures or the flux barriers 106, 108, 110, 112 may have continuous outline. On the other hand, an aperture or a flux barrier 106, 108, 110, 112 may comprise more than one structural parts which are separated from each other by bridges 120 (only four of them are marked in FIG. 1 but in FIG. 2 twelve of them have been marked). The bridge 120 is typically a narrow path of the stack element material through the aperture or the flux barrier 106, 108, 110, 112 in a perpendicular direction with respect to the longitudinal direction of the aperture or the flux barrier.

Figure 3:
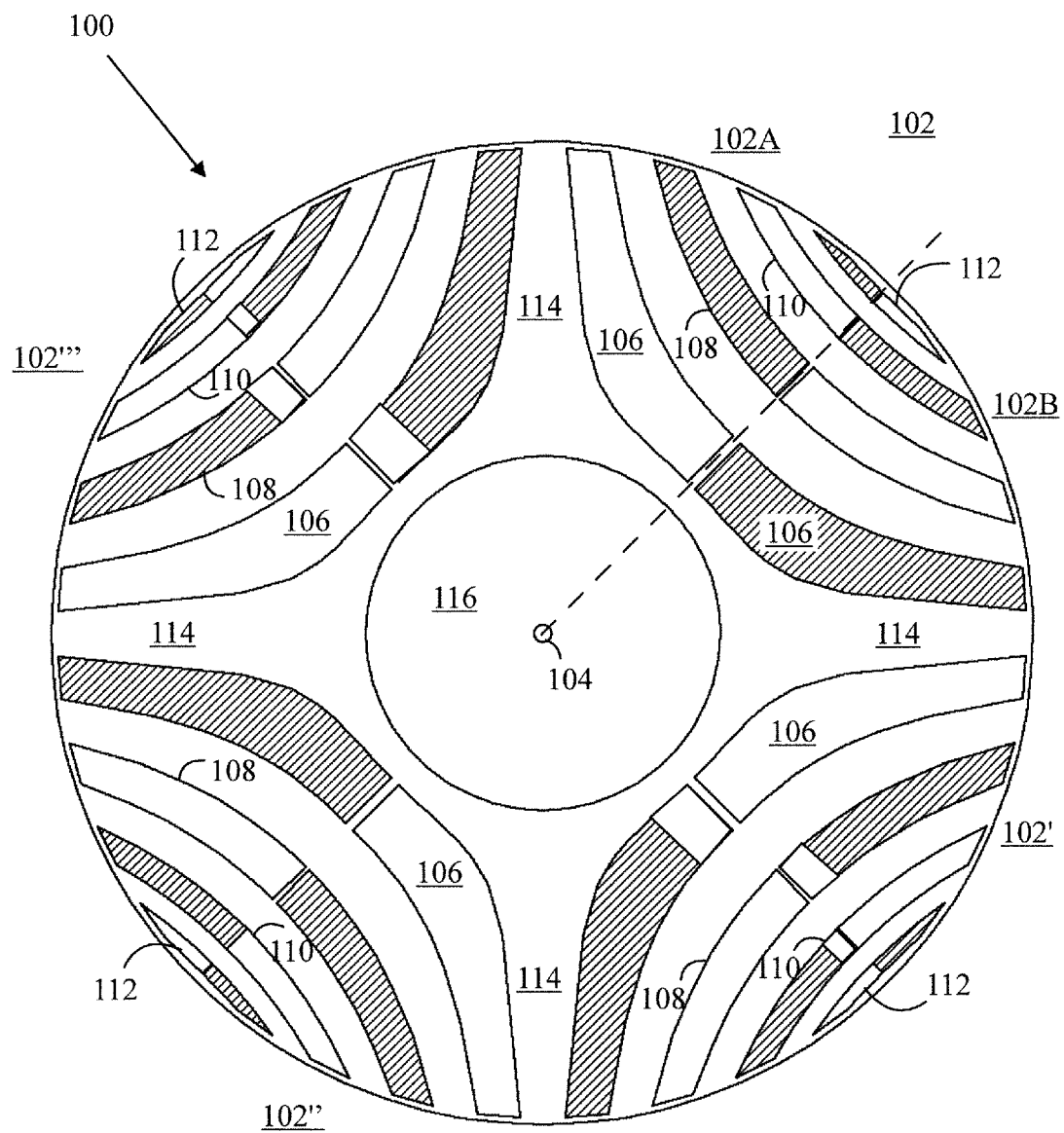
FIG. 3 illustrates an example of a stack element flux barriers of which are alternatively filled in different sectorial sections.

In an embodiment an example of which can be seen in FIG. 3, distributions of the filling of two directly adjacent sectorial sections 102, 102'; 102', 102"; 102", 102'''; or 102, 102''' of the plurality of the sectorial sections 102, 102', 102", 102''' may deviate from each other. The difference between the directly adjacent sectorial sections 102, 102'; 102', 102"; 102", 102'''; or 102, 102''' may be realized in various ways. The difference may be in either end of a flux barrier or between the ends of the flux barrier. Otherwise FIG. 3 is similar to FIG. 1.

In embodiments examples of which can be seen in FIGS. 1 to 6, a distribution of the filling of the flux barriers 106, 108, 110, 112 of the stack element 100 may have rotational symmetry with respect to the rotational axis 104 of the rotor. However, a distribution of the filling of the flux barriers 106, 108, 110, 112 may not have mirror symmetry with respect to any radial direction of the stack element 100.

In embodiments examples of which can be seen in FIGS. 1 to 6, a distribution of the degrees of filling of the flux barriers 106, 108, 110, 112 of the stack element 100 may have rotational symmetry with respect to the rotational axis 104 of the rotor. However, a distribution of the degrees of filling of the flux barriers 106, 108, 110, 112 may have mirror asymmetry with respect to any radial direction of the stack element 100.

In an embodiment an example of which can be seen in FIG. 2, the electrically conductive material may fill a half flux barrier at maximum in a longitudinal direction of the stack flux barrier 106, 108, 110, 112. The electrically conductive material may fill less than half a length of the flux barrier 106, 108, 110, 112. The electrically conductive material may fill less than half in a longitudinal direction of the flux barrier 106, 108, 110, 112. A length of a flux barrier may be determined as a distance through the flux barrier from one end of the flux barrier at a rim of the stack element 100 to an opposite end of the same flux barrier at the rim at another location.

In embodiments examples of which can be seen in FIGS. 1 to 5, one flux barrier 106, 108, 110, 112 of the stack element 100 may have the electrically conductive material, and another flux barrier 106, 108, 110, 112 of the same stack element 100 may be without the electrically conductive material in a common sectorial half 102A, 102B.

Figure 4:
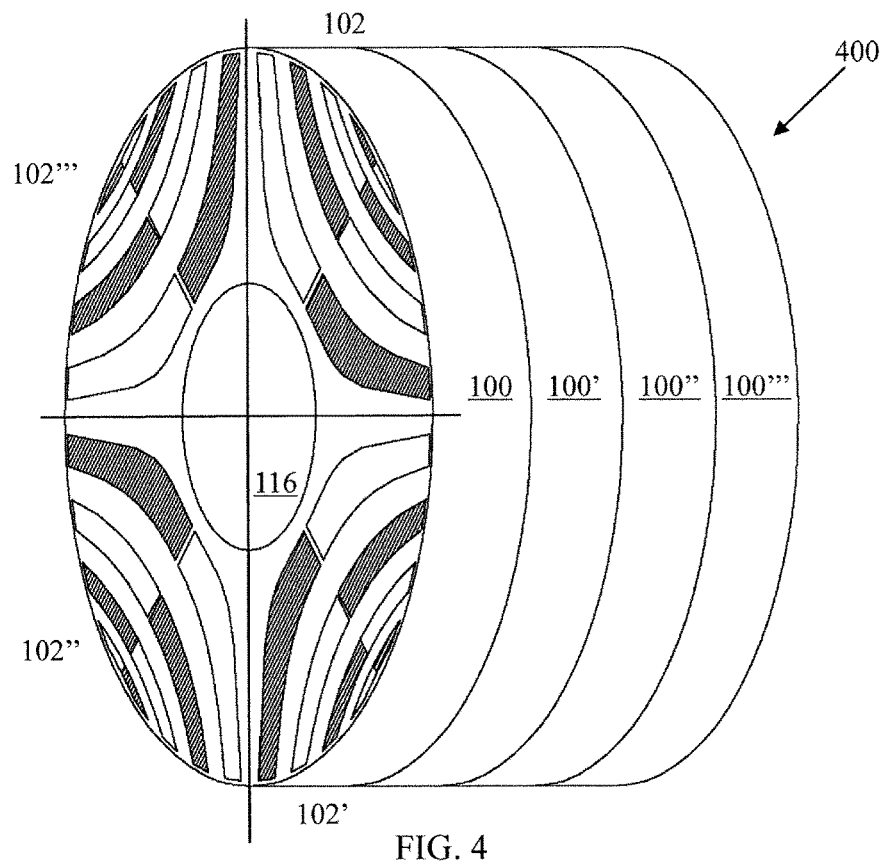
FIG. 4 illustrates an example of a stack of a rotor.
Figure 5:
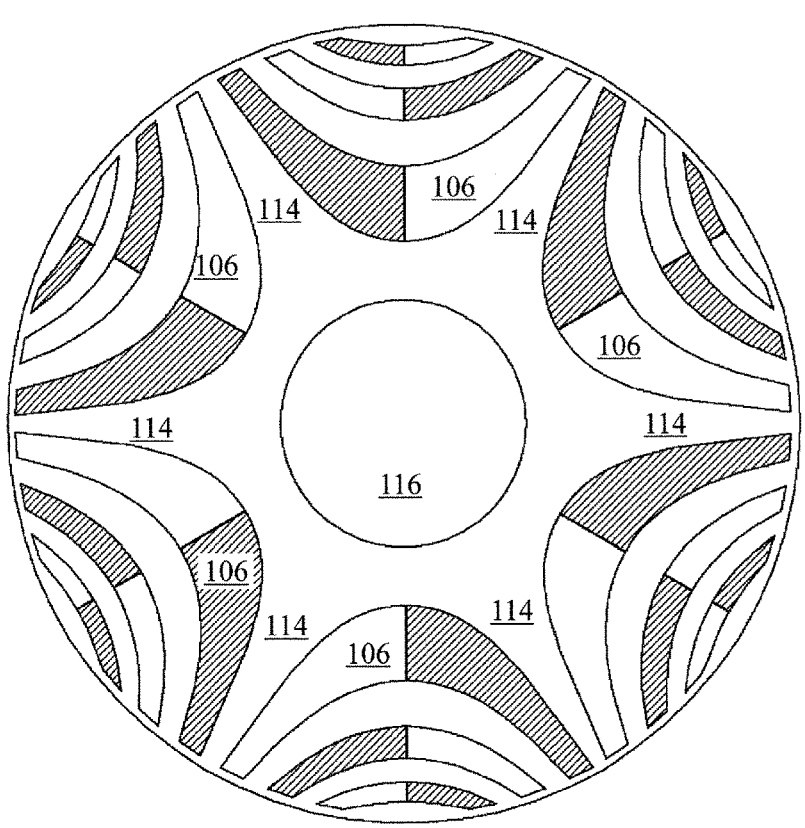
FIG. 5 illustrates an example of a stack element of a six-pole rotor.

In embodiments examples of which can be seen in FIGS. 1, 4, and 5, each of the flux barriers 106, 108, 110, 112 may be approximately half filled with the electrically conductive material in a common sectorial section 102, 102', 102", 102'''. Still, the halves 102A, 102B, in which the electrically conductive material is, may be different halves for at least two flux barriers 106, 108, 110, 112.

In an embodiment shown in FIGS. 1 and 3, two directly adjacent sectorial sections 102, 102'; 102', 102"; 102", 102'''; 102, 102''' of the plurality of sectorial sections 102, 102', 102", 102''' may be separated from each other by a continuous material corridor 114 extending radially over said stack element 100 between a rim and a shaft hole 116 of the stack element 100. The material of the corridor 114 may be the same as the material of the stack element 100 excluding the flux barriers 106, 108, 110, 112. The flux barriers 106, 108, 110, 112 of different sectorial sections 102, 102', 102", 102''' are thus physically separate from each other.

FIG. 4 illustrates an example of a stack 400 of a rotor for an electric motor or generator. The rotor comprises a plurality of the stack elements 100, 100', 100", 100''' which are typically laminated together for forming the stack 400. The electric machine may be a synchronous reluctance motor or generator, for example.

In an embodiment, each of the plurality of the sectorial sections 102, 102', 102", 102''' of one stack element 100 is overlapped with a corresponding sectorial section of another stack element of the stack 100 in a determined manner. The fillings of the flux barriers 106, 108, 110, 112 in two directly adjacent stack elements 100, 100'; 100', 100"; 100", 100''' and in a common sectorial section 102, 102', 102", 102''' may be distributed in a similar manner. In an embodiment, the distribution of fillings may be identical. For example, the sectorial section 102 of a stack element in FIG. 1 is overlapping with a sectorial section 102 of a stack element in FIG. 3.

In an embodiment, the fillings of the flux barriers 106, 108, 110, 112 in two directly adjacent stack elements 100 may be distributed in a dissimilar manner. In an embodiment, the distribution may be non-identical. For example, the sectorial section 102' of a stack element in FIG. 1 is overlapping with a sectorial section 102' of a stack element in FIG. 3. It is also possible that all sectorial sections have different distribution of fillings between two directly adjacent stack elements.

Based on what is explained above, the filled side of a flux barrier with respect to the middle line (dashed line in FIG. 1), which halves a sectorial section, may be alternated between the sectorial sections. In other words, the filled side of a flux barrier with respect to the middle line, which halves a sectorial section, may be alternated as a function of a sectorial section. That is, a left side of a flux barrier may be filled in one sectorial section and a right side of a corresponding flux barrier may be filled in the next sectorial section (see FIG. 6).

FIG. 5 illustrates another example of the stack element 100 with flux barriers which are half filled (filling with dashed line). In general, the flux barriers may be lengthwise partially filled with electrically conductive but magnetically non-conductive material. In this example, there are six sectorial sections and thus typically six poles. In this example, the number of the flux barriers in each sectorial section is also different from that in the previous Figures.

Figure 6:
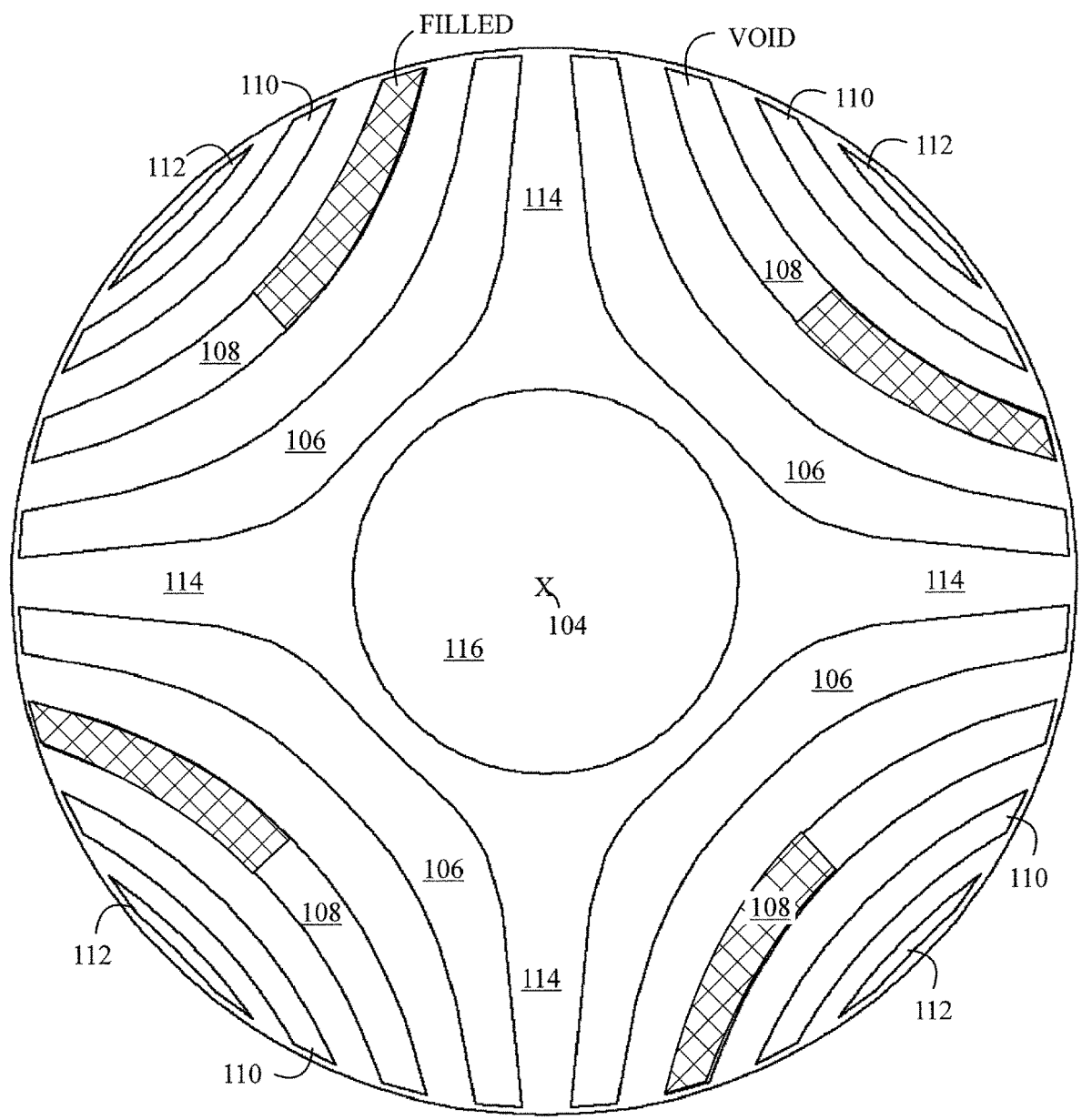
FIG. 6 illustrates an example of a stack element without bridges.

FIG. 6 illustrates still another example of the stack element 100 with partly filled flux barriers. In this example, there are no bridges 120. There may be only one partially filled flux barrier is each sectorial section. In general, there may be an arbitrary number of partially filled flux barriers in each sectorial section.

The partial filling of the flux barriers 106, 108, 110, 112 reduces the rotor losses and then the total losses may also be decreased. Starting current will be decreased while starting torque remains in a good level. Unsymmetrical filling of the sectorial sections reduces the consumption of aluminum and losses created by the cage in a steady state.

In an embodiment, a rotor may have an even number $2p$ of poles. The rotor comprises a substantially cylindrical laminate stack having a plurality of magnetically conductive laminations which are stack elements 100. One or more of said magnetically conductive laminations comprise non-magnetic flux barriers 106, 108, 110, 112 which are spaced from each other in the radial direction. One or more of said non-magnetic flux barriers 106, 108, 110 have magnetically conductive bridges 120 which define at least one first air-gap with the outer rim of said magnetically conductive lamination. The magnetically conductive bridges 120 also define a first internal space between bridges 120 (see dashed areas in FIG. 2). The first internal spaces in the flux barriers 106, 108, 110 are filled with an electrically conductive and magnetically non-conductive material.

In an embodiment, a rotor has a number n of poles pairs (p) that define corresponding direct pole axis (D-axis) and quadrature axis (Q-axis). The rotor has a plurality of the magnetically conductive laminations stacked in a rotor axial direction z. Said magnetically conductive laminations may comprise cut-out portions forming a plurality of flux barriers 106, 108, 110, 112. The flux barriers 106, 108, 110, 112 may extend continuously with respect to said Q-axis from a first rim portion to a second rim portion of said magnetically conductive laminations radially alternated by flux paths. That is, the flux barriers 106, 108, 110, 112 extend lengthwise from one part of the rim to another part of the rim. The flux barriers 106, 108, 110, 112 may be curvy such that the sign of the value of the curvature is opposite to that of the rim in the same sector. The plurality of flux barriers 106, 108, 110, 112 may form a corresponding plurality of cavities i.e. flux channels extending in the rotor core along said axial direction z. At least some of said plurality of cavities may be at least partially filled with a magnetically non-conductive material. Said cavities may further comprise a plurality of channels spaced circumferentially and along the axial direction z. Each of said channels may connect transversally two adjacent cavities of said plurality of cavities, at least some of said channels being at least partially filled with a magnetically non-conductive material.

Figure 7:
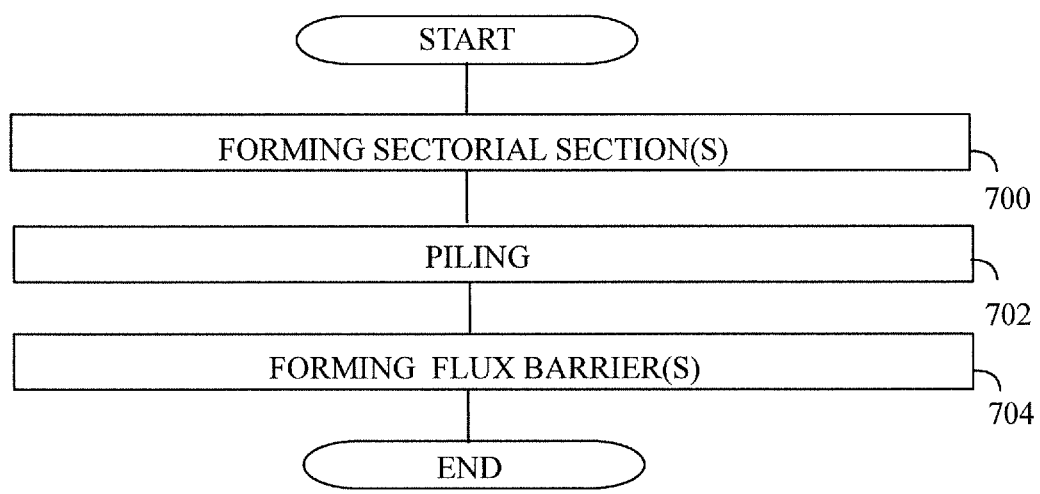
FIG. 7 illustrates of an example of a flow chart of a manufacturing method.

FIG. 7 is a flow chart of a method for manufacturing a stack element of a rotor of an electric machine. In step 700, sectorial sections 102, 102', 102", 102''' are formed, in a stack element 100 comprising material of first magnetic conductance, round a rotational axis 104 of the stack element 100 by manufacturing at least one aperture for each of at least one flux barrier 106, 108, 110, 112 in each of the sectorial sections 102, 102', 102", 102'''. In step 702, the stack elements 100, 100', 100", 100''' are piled together. In step 704, at least one flux barrier 106, 108, 110, 112, which has a difference associated with filling of an electrically conductive material of a third magnetic conductance in different sectorial halves 102A, 102B of a common sectorial section 102, 102', 102", 102''' is formed in each of the sectorial sections 102, 102', 102", 102''' of at least one of the stack elements 100, the first magnetic conductance being larger than the third magnetic conductance.

It will be obvious to a person skilled in the art that, as technology advances, the inventive concept can be implemented in various ways. The invention and its embodiments are not limited to the example embodiments described above but may vary within the scope of the claims.

The invention claimed is:

1. A rotor for an electric machine, wherein the rotor comprises a plurality of stack elements and each of the stack elements comprises material of first magnetic conductance;
   each of the stack elements comprises a plurality of sectorial sections distributed round a rotational axis of the rotor;
   each of the sectorial sections comprises one or more flux barriers; and
   at least one of said one or more flux barriers has a difference associated with filling of an electrically conductive material of a third magnetic conductance in different sectorial halves of a common sectorial section, a numeric value of the first magnetic conductance being larger than that of the third magnetic conductance;
   wherein the fillings of the flux barriers in two directly adjacent stack elements are configured to be distributed non-identically.

2. The rotor of claim 1, wherein the filling of one of the flux barriers is configured to deviate from that of another of the flux barriers in a common sectorial half of at least one of the plurality of the sectorial sections.

3. The rotor of claim 1, wherein distributions of said fillings of two directly adjacent sectorial sections of the plurality of the sectorial sections are configured to deviate from each other.

4. The rotor of claim 1, wherein the fillings of the flux barriers are configured to have a rotational symmetry with respect to the rotational axis of the rotor without a mirror symmetry with respect to a radial direction of the stack elements.

5. The rotor of claim 1, wherein the electrically conductive material is configured to fill half a flux barrier at maximum in a longitudinal direction of the flux barrier.

6. The rotor of claim 1, wherein one of the flux barriers is configured to have the electrically conductive material, and another of the flux barriers is configured to be without the electrically conductive material within a common sectorial half.

7. The rotor of claim 1, wherein the at least one flux barrier is configured to have the electrically conductive material at least approximately in only one sectorial half.

8. The rotor of claim 1, wherein two directly adjacent sectorial sections of the sectorial sections are separated from each other by a continuous material corridor extending radially over said stack element between a rim and a shaft hole of said stack element.

9. The rotor of claim 1, wherein each of the plurality of the sectorial sections of one stack element is configured to be overlapped with a corresponding sectorial section of another stack element of the rotor in a determined manner; and the fillings of the flux barriers in two directly adjacent stack elements are configured to be distributed in a similar manner.

10. A method of manufacturing a rotor of an electric machine, the method comprising:
    forming, in each stack element comprising material of first magnetic conductance, sectorial sections round a rotational axis of the stack element;
    piling the stack elements together; and
    forming, in each of the sectorial sections of at least one of the stack elements, at least one flux barrier which has a difference associated with filling of an electrically conductive material of a third magnetic conductance in different sectorial halves of a common sectorial section, a numeric value of the first magnetic conductance being larger than that of the third magnetic conductance;
    wherein the fillings of the flux barriers in two directly adjacent stack elements are configured to be distributed non-identically.

* * * * *